United States Patent
Davis et al.

(10) Patent No.: US 10,636,064 B2
(45) Date of Patent: Apr. 28, 2020

(54) METHOD FOR MONETIZATION OF THE DATA PROCESSING OF ULTRASONIC SCAN DATA FILES

(71) Applicant: VeriPhase, Inc., Birmingham, AL (US)

(72) Inventors: John Mark Davis, Hoover, AL (US); Archibald Leach Cobbs, Mountain Brook, AL (US); Charles Allan Hansen, Sterrett, AL (US); Nicholas James Bublitz, Chelsea, AL (US); Samuel Matthew Davis, Birmingham, AL (US)

(73) Assignee: VeriPhase, Inc., Birmingham, AL (US)

( * ) Notice: Subject to any disclaimer, the term of this patent is extended or adjusted under 35 U.S.C. 154(b) by 0 days.

(21) Appl. No.: 16/436,491

(22) Filed: Jun. 10, 2019

(65) Prior Publication Data
US 2019/0295137 A1 Sep. 26, 2019

Related U.S. Application Data

(63) Continuation-in-part of application No. 16/416,164, filed on May 18, 2019, now Pat. No. 10,557,833, and a continuation-in-part of application No. 16/402,715, filed on May 3, 2019, and a continuation-in-part of application No. 16/375,611, filed on Apr. 4, 2019, and a continuation-in-part of application No. 14/986,195, filed on Dec. 31, 2015, now Pat. No. 10,324,066.

(51) Int. Cl.
*G06Q 30/02* (2012.01)
*G06Q 10/06* (2012.01)

(52) U.S. Cl.
CPC ....... *G06Q 30/0283* (2013.01); *G06Q 10/067* (2013.01)

(58) Field of Classification Search
CPC .. G01N 29/043; G01N 29/44; G01N 29/4445; G01N 29/069; G01N 2291/044; G01N 2291/0234; G06Q 30/0283; G06Q 10/067
See application file for complete search history.

(56) References Cited

U.S. PATENT DOCUMENTS

| | | | | |
|---|---|---|---|---|
| 5,619,423 A | * | 4/1997 | Scrantz | G01N 29/2412 324/220 |
| 6,220,099 B1 | * | 4/2001 | Marti | G01N 29/069 73/633 |
| 6,549,820 B1 | * | 4/2003 | Barrett | G01N 29/0609 382/141 |

(Continued)

*Primary Examiner* — Natalie Huls
(74) *Attorney, Agent, or Firm* — The Gache Law Firm, P.C.; Russell C. Gache

(57) ABSTRACT

A method of monetization of the processing of a collection of ultrasonic data files is disclosed. The process accesses each scan data file and reads meta-data held by that scan data file. Responsive to the extant meta-data, a pricing model is applied, and a processing cost calculated for the processing of each data file. That pricing information is then associated with a customer account and invoiced at a time of choosing of the processing company. Various pricing models may be applied responsive to the characteristics of the data file processed, and responsive to the timeliness and priority of such processing.

20 Claims, 3 Drawing Sheets

(56) References Cited

U.S. PATENT DOCUMENTS

| | | | | |
|---|---|---|---|---|
| 6,813,949 | B2* | 11/2004 | Masaniello | F17D 5/02 73/602 |
| 7,856,227 | B2 | 12/2010 | Kondo et al. | |
| 8,447,532 | B1* | 5/2013 | Goroshevskiy | G01L 1/125 702/185 |
| 8,542,127 | B1* | 9/2013 | Goroshevskiy | G01N 27/82 324/309 |
| 8,577,629 | B2* | 11/2013 | Simard | G01N 29/30 702/58 |
| 8,841,901 | B2* | 9/2014 | Goroshevskiy | G01S 19/49 324/228 |
| 9,218,470 | B2* | 12/2015 | Domke | G06F 21/31 |
| 10,324,066 | B1* | 6/2019 | Davis | G01N 29/48 |
| 2007/0253519 | A1* | 11/2007 | Meier | G01N 29/2487 376/260 |
| 2008/0072674 | A1* | 3/2008 | Ume | G01N 29/0618 73/627 |
| 2009/0164143 | A1* | 6/2009 | Duckworth | G01M 5/0025 702/38 |
| 2009/0320598 | A1* | 12/2009 | Puchner | G01N 29/075 73/588 |
| 2010/0123080 | A1* | 5/2010 | Andres | B23K 9/0956 250/341.6 |
| 2013/0132034 | A1* | 5/2013 | Wilson | G01M 5/00 702/183 |
| 2013/0184587 | A1 | 7/2013 | Eom et al. | |
| 2015/0212048 | A1* | 7/2015 | Ganesan | G01D 5/12 73/632 |
| 2016/0139593 | A1* | 5/2016 | Willett | B23K 26/032 700/109 |
| 2016/0231278 | A1* | 8/2016 | Goroshevskiy | G01N 27/82 |
| 2016/0253743 | A1 | 9/2016 | David | |
| 2017/0074830 | A1* | 3/2017 | Bellotti | G01N 29/045 |
| 2018/0031152 | A1* | 2/2018 | Rajagopalan | B23K 37/003 |
| 2018/0056447 | A1* | 3/2018 | Todorov | B23K 31/02 |
| 2018/0136169 | A1* | 5/2018 | Ume | G01N 29/04 |
| 2019/0187106 | A1* | 6/2019 | Goodman | G01N 29/4427 |

\* cited by examiner

FIG. 3

| TIME | POSTED | USER | ACCOUNT | ANALYSIS NAME | SETUP | ANALYSIS ID | WELD LENGTH | FILE | SIZE | FILE ID | DATA ID |
|---|---|---|---|---|---|---|---|---|---|---|---|
| 02/27/2019 20:35:54 | 02/27/2019 20:35:56 | User 1 | Client 1 | Rapid Run Single Si | Single Sided | 7c100817-d696c757 | 13.039 in. | Rapid Run Single Si | 7.63 MB | 9542a0b0-fadcc500 | 4ea528bc-e24195ce |
| 02/27/2019 20:33:22 | 02/27/2019 20:33:24 | User 1 | Client 1 | Rapid Run Single Si | Single Sided | ddb2900b-b3c0e21e | 13.039 in. | Rapid Run Single Si | 7.63 MB | 9542a0b0-fadcc500 | 4ea528bc-e24195ce |
| 02/27/2019 16:29:46 | 02/27/2019 16:29:48 | User 1 | Client 1 | Clean Tower 390 inc | Dual Sided | 6bf7776f-44ff35ea | 472.481 in. | Clean Tower 390 inc | 245.82 MB | c720ad9d-b58868ce6 | 989aac08-21df4c4a |
| 02/27/2019 16:17:09 | 02/27/2019 16:17:11 | User 1 | Client 1 | 0139103-NG-131035 | Single Sided | 657930b1-07666f90 | 77.399 in. | 0139103-NG-131035 | 67.80 MB | 6f352edf-b4ce3be2 | 973ca4fe-80637d3c |
| 02/27/2019 16:13:47 | 02/27/2019 16:13:49 | User 1 | Client 1 | 0139103-NG-131035 | Single Sided | 28f31bb2-9a7ccc89f | 77.399 in. | 0139103-NG-131035 | 67.80 MB | 6f352edf-b4ce3be2 | 973ca4fe-80637d3c |
| 02/27/2019 16:08:51 | 02/27/2019 16:08:53 | User 1 | Client 1 | 0139103-NG-131035 | Single Sided | 873391e5-d5d06b15 | 77.399 in. | 0139103-NG-131035 | 67.80 MB | 6f352edf-b4ce3be2 | 973ca4fe-80637d3c |
| 02/27/2019 16:04:43 | 02/27/2019 16:04:45 | User 2 | Client 2 | 0139103-NG-131035 | Single Sided | 7fd119c9-d6ba3d1b | 77.399 in. | 0139103-NG-131035 | 67.80 MB | 6f352edf-b4ce3be2 | 973ca4fe-80637d3c |
| 02/27/2019 15:21:14 | 02/27/2019 15:21:15 | User 2 | Client 2 | Clean Tower 390 inc | Dual Sided | c5eadf84-aa98dced | 472.481 in. | Clean Tower 390 inc | 245.82 MB | c720ad9d-b58868ce6 | 989aac08-21df4c4a |
| 02/27/2019 14:58:06 | 02/27/2019 14:58:08 | User 2 | Client 2 | Clean Tower 390 inc | Dual Sided | c44c7d7-2726acc1 | 472.481 in. | Clean Tower 390 inc | 245.82 MB | c720ad9d-b58868ce6 | 989aac08-21df4c4a |
| 02/27/2019 12:45:27 | 02/27/2019 12:45:29 | User 2 | Client 2 | Clean Tower 390 inc | Dual Sided | 5dc677a5-85bc7185 | 472.481 in. | Clean Tower 390 inc | 245.82 MB | c720ad9d-b58868ce6 | 989aac08-21df4c4a |
| 02/27/2019 12:40:12 | 02/27/2019 12:40:14 | User 2 | Client 2 | Clean Tower 390 inc | Dual Sided | c79c3c89-4392df4b | 472.481 in. | Clean Tower 390 inc | 245.82 MB | c720ad9d-b58868ce6 | 989aac08-21df4c4a |
| 02/27/2019 12:33:47 | 02/27/2019 12:33:49 | User 2 | Client 2 | Rapid Run Single Si | Single Sided | a32dbb6b-1994a09f | 13.039 in. | Rapid Run Single Si | 7.63 MB | 9542a0b0-fadcc500 | 4ea528bc-e24195ce |
| 02/27/2019 10:24:12 | 02/27/2019 10:24:13 | User 2 | Client 2 | Run-Indication Towe | Dual Sided | 798cd4a7-8ebc8208 | 63.032 in. | Run-Indication Towe | 33.96 MB | 80220a97-db02e934 | 23020d9f-a2699938 |
| 02/27/2019 09:53:41 | 02/27/2019 09:53:43 | User 2 | Client 2 | Clean Tower 390 inc | Dual Sided | eb1a2cb7-4624ada9 | 472.481 in. | Clean Tower 390 inc | 245.82 MB | c720ad9d-b58868ce6 | 989aac08-21df4c4a |
| 02/27/2019 08:08:25 | 02/27/2019 08:08:51 | User 3 | Client 1 | 12 4 groups-ADT | Dual Sided | defe725c-bbba2ae6 | 13.039 in. | 12 4 groups-ADT.op | 22.02 MB | 32a68e56-f201dff2 | f84a8c6-9900f279 |
| 02/27/2019 02:18:05 | 02/27/2019 02:18:04 | User 4 | Client 3 | One Line 270-1 | Single Sided | 65d7c453-be062ae7 | 18.525 in. | One Line 270-1.opd | 5.36 MB | 00ab2cde-ae817d36 | 8d2cfed9-e630c0b6 |
| 02/27/2019 02:14:34 | 02/27/2019 02:14:32 | User 4 | Client 3 | One Line 90-2 | Single Sided | c08e9f6b-01564ca5 | 18.525 in. | One Line 90-2.opd | 5.36 MB | 169b5f72-48941c36 | 1ad4054b-1419a1b8 |
| 02/26/2019 21:05:48 | 02/26/2019 21:05:49 | User 2 | Client 4 | 270-1-Merged | Dual Sided | 05b7317f-3a02f475 | 18.525 in. | 270-1.opd | 5.36 MB | 00ab2cde-ae817d36 | 8d2cfed9-e630c0b6 |

METHOD FOR MONETIZATION OF THE DATA PROCESSING OF ULTRASONIC SCAN DATA FILES

This application claims the benefit of filing priority under 35 U.S.C. § 119 and 37 C.F.R. § 1.78 of the co-pending U.S. non-provisional application Ser. No. 14/986,195 filed Dec. 31, 2015, for a System and Method for the Improved Analysis of Ultrasonic Weld Data, and of co-pending U.S. non-provisional application Ser. No. 16/375,611 Ultrasonic Weld Analysis for Orthotropic Steel Decking Systems in Bridges filed Apr. 4, 2019, co-pending U.S. non-provisional application Ser. No. 16/402,715 filed May 3, 2019, for a Method for Checking for Consistency and Quality Compliance in an Ultrasonic Scanning Data File, and co-pending U.S. non-provisional application Ser. No. 16/416,164 filed May 18, 2019, for a Method for Prioritizing Data Processing of a Plurality Of Ultrasonic Scan Data Files. All information disclosed in those prior pending nonprovisional applications are hereby incorporated by reference.

FIELD OF THE INVENTION

The present invention relates generally to data processing of computer files. In greater particularity, the present invention relates to methods for the calculation of monetary renumeration for the data processing of scan data files created during the testing of materials using ultrasonic testing equipment.

BACKGROUND OF THE INVENTION

Ultrasonic testing (UT) is a family of non-destructive testing techniques based on the propagation of ultrasonic waves in the object or material tested. In most common UT applications, very short ultrasonic pulse-waves with center frequencies ranging from 0.1-15 MHz, and occasionally up to 50 MHz, are transmitted into materials to detect internal flaws or to characterize materials. A common example is ultrasonic thickness measurement, which tests the thickness of a targeted object to determine the thickness of the object. Pipeline walls are routinely measured in this manner from the exterior of the pipeline to check for internal laminations and wall loss (corrosion and erosion)

Ultrasonic testing is often performed on steel and other metals and alloys, though it can also be used on concrete, wood and composites, albeit with less resolution. It is used in many industries including steel and aluminum construction, metallurgy, manufacturing, aerospace, automotive and other transportation sectors.

In ultrasonic testing, an ultrasound transducer connected to a diagnostic machine is passed over the object being inspected. The transducer is typically separated from the test object by a "couplant" such as oil or water. Phased array ultrasonics (PA) is an advanced method of ultrasonic testing that has applications in medical imaging and industrial nondestructive testing. Common industrial applications are noninvasive examination of manufactured materials such as welds joining large sections of pipes or steel decking for bridges.

Ultrasonic testers are typically separated into two classes of devices. Single-element (non-phased array) probes, known technically as monolithic probes, emit a beam in a fixed direction. To test or interrogate a large volume of material, a single-element probe must be physically scanned (moved or turned) to pass or traverse the beam through the area of interest. In contrast, multi-element (phased array) probes emit beams that can be focused and swept electronically without moving the probe. The beam is controllable because a phased array probe is made up of multiple small elements, each of which can be pulsed individually at a computer-calculated timing. The term "phased" refers to the timing, and the term "array" refers to the multiple elements. Phased array ultrasonic testing or "PAUT" is based on principles of wave physics, which also have applications in fields such as optics and electromagnetic antennae.

In the non-destructive testing of material and welds, the phased array probe emits a series of beams to flood the weld with sound and a flaw can be seen or "read" on a display screen attached to the phased array ultrasonic tester, usually highlighting a weld "indication" or potential flaw as a colored indication on the instrument display screen.

There are two main methods of receiving the ultrasound waveform: reflection and attenuation. In reflection mode sometimes referred to as "pulse-echo" mode, the transducer performs both the sending and the receiving of the pulsed waves as the "sound" is reflected back to the device. Reflected ultrasound comes from an interface, such as the back wall of an object, geometry reflections, or other foreign objects or from an imperfection within the object such as a weld defect. The diagnostic machine displays these results in the form of a signal with an amplitude representing the intensity of the reflection and the distance, representing the arrival time of the reflection. In attenuation mode sometimes referred to as "through-transmission" mode, a transmitter sends ultrasound through one surface, and a separate receiver detects the amount that has reached it on another surface after traveling through the medium. Imperfections or other conditions in the space between the transmitter and receiver reduce the amount of sound transmitted, thus revealing their presence. However, as is known, couplants are needed to provide effective transfer of ultrasonic wave energy between the transducer probes and the objects being inspected to reduce or eliminate the attenuation from air to ensure enough ultrasonic energy is present inside the object so a useable ultrasonic response can be obtained.

For the testing of materials and in particular for the testing of welds, the pulse-echo method is preferred and various PAUT devices are offered in the non-destructive testing industry for such testing. For example, Olympus Scientific Solutions Americas Inc., (aka Olympus NDT) based in Waltham, Mass., offers a product under the name OmniScan/OmniPC which may be used to test steel structures for determining inspection compliance. Using such a product is often referred to as "scanning" a weld and such testing produces "scan data" representing the area tested which can be read back and reviewed at a time of choosing by an inspector. Such captured scan data can be saved in common data storage systems, such as cloud-based storage, and retrieved at any time for review using known PC based systems. Further, later and evolving systems can access such weld scan data and assist in the identification of potential weld defects by removing nominal or non-suspect scan data to lessen the amount of time required for an inspector to review the data and to focus attention on suspected areas that may represent a potential weld flaw.

A suitable procedure for taking scans, recording those scans, and then analyzing the scans to reduce the examination burden for the inspector is found in U.S. patent application Ser. No. 14/986,195 (issued as U.S. Pat. No. 10,324, 066), pages 7-22, and all referenced figures, all of which are hereby incorporated by reference. In association with standard ultrasonic weld analysis techniques, and using the procedure disclosed in the above referenced application for determining ultrasonic reflection amplitudes (i.e. "voxels"), weld seams may be non-destructively tested to determine code or procedural compliance. Further discussion regarding the use of a PAUT system, understanding the testing procedures for welds using such a system, the reading of a PAUT display, the reading of a display produced by an associated PC application to view testing data, and how to calculate the distances and dimensions provided by such a testing application shall not be provided as such information is either well understood or fully disclosed in the above referenced application, or not necessary for a complete and full understanding of the herein described invention.

As can be seen from the above description, a good many scan files will be created for any project, such as in a bridge construction project in which a good many welds would need to be inspected. Further, modern processing systems use cloud-based processing models to allow for scaling of processing power in relation to the processing need from moment to moment. Hence, for an enterprise providing scan file processing in an uploaded cloud-based topology for a multitude of third parties, a continual flow of scan files will be processed. However, each scan file is unique in its size and data complexity, and the processing requirements will also be unique. Nevertheless, for any third-party providing processing services, a pricing model must be established that is convenient and timely for each processing event, as well as be suitable to the organization and processing of a plurality of processing jobs that span a single project. Pricing models must also vary depending upon contracted pricing strategies and various other meta-data values for each scan file processed Such a monetization system for processing a plurality of ultrasonic scan data files does not currently exist.

Therefore, what is needed is a method for automatically establishing a price for each scan data file as it is processed, or a price determined after processing, for each scan data file in relation to meta-data representative of each scan data file.

SUMMARY OF THE INVENTION

It is the object of the present invention to provide a method of monetization of the processing of a collection of ultrasonic data files. The current process accesses each scan data file and reads meta-data held by that scan data file. Responsive to the extant meta-data, a pricing model is applied, and a processing cost calculated for the processing of each data file. That pricing information is then associated with a customer account and invoiced at a time of choosing of the processing company. Various pricing models may be applied responsive to the characteristics of the data file processed, and responsive to the timeliness and priority of such processing.

Other features and objects and advantages of the present invention will become apparent from a reading of the following description as well as a study of the appended drawings.

BRIEF DESCRIPTION OF THE DRAWINGS

A method incorporating the features of the invention is depicted in the attached drawings which form a portion of the disclosure and wherein.

DESCRIPTION OF THE PREFERRED EMBODIMENTS

Figure 1:
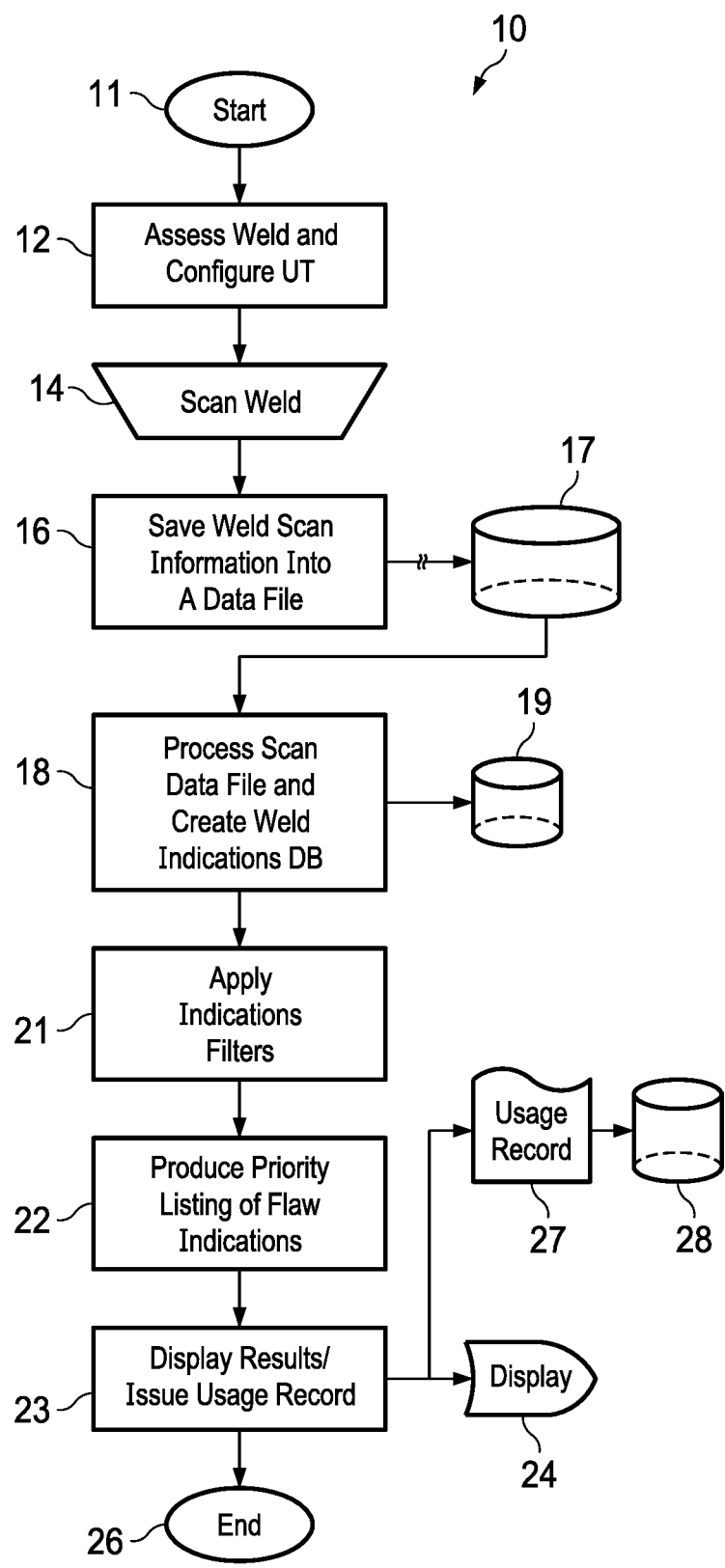
FIG. 1 a flow diagram showing the steps in collecting and data processing of scan data on a weld and the production of a usage record for such processing.

Referring to the drawings for a better understanding of the function and structure of the invention, FIG. 1 shows a method for collecting weld scanning data and the saving of such data into a scan data file for further analysis as disclosed in the above referenced U.S. patent application Ser. No. 14/986,195. As shown, system 10 shows a system that reduces the number of weld scan indications that an inspector must review in order to more efficiently produce a report meeting applicable welding examination codes and requirements, such as those published by ASME, AWS, or other organizations. The system 10 is a standard software application that may run on a standard Windows™ operating system, such as for example Windows 7 or Windows 10 sold by Microsoft Corporation, running on a standard PC configuration. The system may also be incorporated as a module directly into existing testing and/or scan analysis software.

Initially, an inspector assesses a weld situation and then configures their PAUT equipment for a scan, including the positioning of the UT probe 12 adjacent to a target weld. The weld is scanned by the inspector 14 and a data file recording the weld scan data saved 16. The data may be saved locally on the UT device, transferred to a connected drive storage 17, or uploaded to a network drive via Wi-Fi or other data connection, depending upon the size of the data file. The scan file is then processed 18 by extracting all data cuboids that include potential weld flaw indications, essentially extracting all cuboids that have amplitudes greater than 0, and then creates a file recording those indications and saves it in a local, fast access storage location 19. Further processing occurs on the indications file by applying a series of filters 21 that ranks and categorizes the indications into a usable form. In particular, a ranked list of indications is created in a table based on a ranking value for each indication which consists of multiple data cuboids. That priority listing of indications is then produced 22 and displayed 23 for the inspector's analysis at a place and time of their choosing.

The process shown in 10, referred to hereinafter as a UT data analyzer typically removes over 95 percent of the non-relevant data stored in a scan data file, and presents a focused list of only a fraction of the overall indications held by a scan data file, without degrading an inspector's ability to properly review the scan data in accordance with applicable code or procedural requirements. A usage record 27 is also created and stored 28 capturing information about the circumstances of processing of data file.

Figure 2:
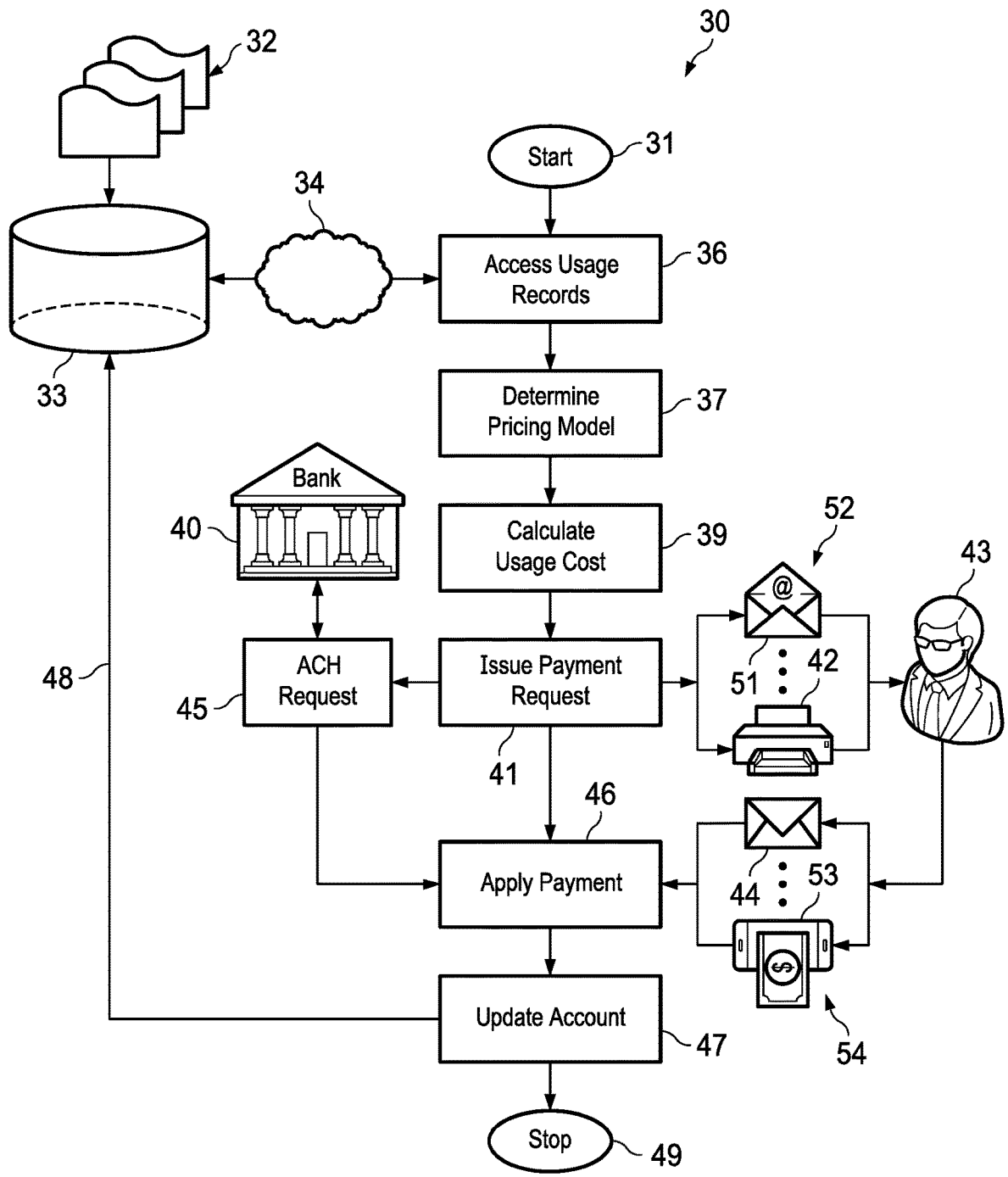
FIG. 2 is a flow diagram of steps to apply a pricing model to a processed scan data file and obtain payment automatically for such processing; and, FIG. 3 is an example administrative console interface window showing various types of meta-data for a set of processed scan data files.

FIG. 2 shows a method for utilizing the usage record 27 generated during processing of the scan data file per process 10 to determine a price for the processing of a scan data file. An example administrative interface console window or "admin" console is shown in FIG. 3 illustrating different types of meta-data upon which the method of FIG. 2 may depend.

A collection of scan data, processing usage records 32 are held in computer storage 33. Each of those usage records are accessed 36 likely via a cloud-based communication path 34, a pricing model selected 37 for determining the price for the processing event. Once a pricing model is selected, the cost is calculated 39 and recorded in a client account for the party owning the processed scan data file. A payment request is then issued by the scan file processing service provider to the party 41 which may take the form of either a printed invoice 42 or email request 51 that is sent to the party 43, or an ACH (Automated Clearing House) payment request issued 45 directly to a client designated financial institution 40. Responsive to those requests 52, a payment 54 is issued either via ACH debit or mailed check 44. Alternatively, the party may use an e-commerce third party to make payment 53 such as via PayPal, Vimeo, a credit card company like Visa, or the like. Any of these forms of payment may then be applied to the client's account 46. The client's account is then updated 47 and recorded in an account record held by the processing service provider in computer storage 33.

As shown in FIG. 3, an admin console 50 is available to the processing service provider that shows various types of meta-data unique to the processing of each scan data file by user authorized by a client. The admin console 50 consists of a plurality of usage records 73 held as a row entry in a spreadsheet and holding specific types of data file information. The console provides various other tabs 51 to view client specific information such as an account listing, authorized users, processed usage records, a list of active users, an audit trail, and admin tools. The console also provides a convenient means to generate a usage detail report for a customer, which lists for some time period all of the activity on which the customer's billing charges are based Each usage record includes various information about the circumstances of processing, such as: the time when the scan data file was processed 52; the time when the usage records was posted to the admin server 54; the user account from which the processing request was initiated 57; the client account to which any charges would be assessed 58; the data processing name assigned to the possessing event by the user 61; whether the scan was a single sided or double sided scan setup configuration at the time that the scan was taken 62; an assigned analysis ID 64; the length of the weld that was scanned in inches 66; the scan file data file name 67; the size of the scan file processed 68; the file ID assigned to the processed scan data file (typically a random number) 71; and a data ID number assigned to the scan data file 72. The file ID and data ID numbers are distinct because the file ID is consistent with the data file processed, but the data ID is dependent upon the scan data points present in the file which is specific to the data scanned and is consistent for that data contained in the scan data file, even when the scan data file may change due to meta-data changes or other variable changes in the scan data file that are distinct from the processed scan data.

Referring the Table 1.0 below, various types of pricing models may be applied to any data processing event recorded in the usage record assigned to a processing event. In particular, the length of a scan of a weld may determine the pricing since a client may have negotiated a cost per length scanning pricing strategy. The data file size may determine the price. For example, a price may be calculated based on the a price per MB charge, or similar size metric. Also, some types of welds may require certain changes to processing complexity to accommodate an inspector's review or reporting requirements, and hence the material or type of weld may determine the pricing. So, for example, a weld in a pipe having a particular diameter may be priced a different cost than say a bridge bed having orthotropic steel decking. Similarly, the type of scan may also affect the degree of complexity each scan data file may hold, including one type of scan job holding more or less weld indications for a particular file. The more complex a scan data file, the more processing may be required, thereby potentially increasing cost. A flat processing time record may determine price, similarly to recorded CPU usage time utilized in older main-frame systems.

In addition to the above scan file parameter-based pricing, the priority of the processing may affect the pricing model applied. So, for example, a batch pricing model may be advantageous to reduce processing costs, versus an instantaneous processing model when a set of indications for inspection are required immediately. In addition, real-time processing may be required so that as a scan is being conducted an immediate feedback mechanism is also provided so that the weld may be marked for certain types of indications encountered during the scanning process. Such processing may be available from within the machine to which the scanning probe is attached or with the addition of a fast bandwidth connection and remote real-time processing and feedback in advanced systems. For example, a paint marker may mark a particular location on a weld seam as the scanning probe moves along the weld seam while making marks along that seam as weld indications are encountered. Hence, a file may be processed in real-time and the number of indications recorded to determine the pricing for the real-time marking job.

TABLE 1

| No. | Pricing Model Type | Pricing Model Type Description |
| --- | --- | --- |
| 1 | Scan Length | Pricing dependent upon the weld length recorded in the scan file. |
| 2 | Data File Size/Quantity | Pricing dependent upon the size and number of data files processed. |
| 3 | Weld Application | Pricing dependent upon the weld materials and weld placement on a type of material or structure (e.g. a pipe, road deck, etc.) |
| 4 | Scan File Volume | Pricing dependent upon the size of the scan data recorded in the scan data file. |
| 5 | Weld Designation | Pricing dependent upon the particular weld upon which the scan was obtained. |
| 6 | Indications Based | Pricing dependent upon the number of weld indications present in the scan data file. |
| 7 | Processing Resource | The amount of processing resources consumed during data processing of the particular scan data file. |

TABLE 1-continued

| No. | Pricing Model Type | Pricing Model Type Description |
|---|---|---|
| 8 | Temporal Processing Priority | Pricing dependent upon the temporal priority assigned to the processing of a particular scan data file. |
| 9 | Real-time Feedback | Pricing assigned to real-time feedback of a scanning operation (e.g. marking of potential weld defects) |

While I have shown my invention in one form, it will be obvious to those skilled in the art that it is not so limited but is susceptible of various changes and modifications without departing from the spirit thereof.

Having set forth the nature of the invention, what is claimed is:

1. A method for monetizing the data processing of a plurality of ultrasonic scan data files, comprising the steps of:
   a. using a computing device to data process a plurality of ultrasonic scan data files to produce an indications list for each said data file so that an inspector reviewing said scan data file can review only said indications list instead of said entire ultrasonic scan data file;
   b. responsive to said processing step, creating a processing usage record for each said processed data file and saving each said usage record in computer data storage;
   c. responsive to the availability of a plurality of said scan usage records in said computer data storage, accessing a selected one of said plurality of usage records and selecting a pricing model to be utilized for said selected one usage record;
   d. based on said selected pricing model, calculating a processing cost for the processing of said data file associated with said usage record; and,
   e. issuing a payment request to a client for payment of said calculated processing cost.

2. The method as recited in claim 1, wherein said step of selecting a pricing model to calculate a processing cost is determined from a scan data file characteristic selected from the group consisting of the length of the scan, the type of weld scanned, the scan file size, the number of weld indications present in the scan file, the amount of processing time required to process the scan data file, the temporal processing priority assigned to processing the scan data file, and whether real-time feed-back of the presence of certain types of indications is utilized.

3. The method as recited in claim 2, wherein said step of selecting a pricing model comprises calculating a processing price responsive to a real-time processing and marking scanning action.

4. The method as recited in claim 3, wherein said method for monetizing further includes the step of viewing an admin console displaying a usage record displaying information created from said processing step.

5. The method as recited in claim 4, wherein said step of selecting a pricing model includes the step of accessing a data file that associates a particular pricing model selected from a plurality of pricing models with said client.

6. The method as recited in claim 2, wherein said step of selecting a pricing model comprises calculating a processing cost responsive to local, real-time processing scanning action wherein said processing step occurs locally in a computing device electronically connected to a probe used to produce said scan data file.

7. The method as recited in claim 1, wherein said data processing step comprises the steps of:
   a. wherein each said scan data file holds a plurality of two dimensional, coordinate based cell matrices representing slices of known thickness of a scanned weld seam, and wherein each cell holds a reflection amplitude value representing a potential weld flaw along the weld seam, using a computer processor to extract weld indications from said data file by saving all non-zero magnitude values in each said cell into a table recording weld indications while preserving location information of each said cell along said weld seam in said table;
   b. assigning a significance score to each said extracted indication saved in said new indications table based on a preselected criteria;
   c. ranking each said indication based upon said significance score and saving said ranking in said table;
   d. integrating said indications table into said scan data file; and,
   e. based on said significance score, electronically producing a human perceivable account showing a portion of said ranked indications along with associated location information for each in said weld seam for a weld inspector's review.

8. The method as recited in claim 7, wherein said step of selecting a pricing model comprises calculating a processing price based on the number of weld indications present in the scan data file.

9. The method as recited in claim 7, wherein said step of selecting a pricing model comprises calculating a processing price based upon the data file size.

10. The method as recited in claim 1, wherein said step of issuing a payment request comprises the step of issuing an electronic deduction request from a client account from a client subscriber financial institution.

11. A method for monetizing the data processing of a plurality of ultrasonic scan data files, comprising the steps of:
   a. using at least one computer processor to serially process a plurality of ultrasonic scan data files using a scalable cloud-based processing system from a cloud based storage system holding said plurality of scan data files to produce an indications list for each said data file so that an inspector reviewing said scan data file can review only said indications list instead of said entire ultrasonic scan data file;
   b. responsive to said processing step, creating a processing usage record for each said processed data file and saving each said usage record in said cloud-based computer data storage;
   c. responsive to the availability of a scan usage record in said cloud-based computer data storage, selecting a usage record and assigning a pricing model to be utilized for said selected one usage record;
   d. based on said selected pricing model, calculating a processing cost for the processing of said data file associated with said usage record; and, e. automatically issuing a payment request to a financial account for a client responsible for payment of said calculated processing cost.

12. The method as recited in claim 11, wherein said step of selecting a pricing model comprises calculating a processing price based on the number of weld indications present in the scan data file.

13. The method as recited in claim 12, wherein said step of selecting a pricing model comprises calculating a processing cost responsive to a real-time processing and marking scanning action.

14. The method as recited in claim 13, wherein said step of issuing a payment request comprises the step of issuing an electronic deduction request from a client account from a client subscriber financial institution.

15. The method as recited in claim 11, wherein said step of selecting a pricing model comprises calculating a processing price based upon the data file size.

16. A method for calculating the cost for processing an ultrasonic scan data file, comprising the steps of:
   a. using a computer to data process an ultrasonic scan data file to produce an indications list that is integrated into said data file so that an inspector reviewing said scan data file may review said listed indications in said scan data file rather than reviewing the entire ultrasonic scan data file;
   b. responsive to said processing step, creating a processing usage record for said processed data file and saving each said usage record in a computer file;
   c. responsive to information held in said usage record, selecting a pricing model associated with the client responsible for the cost of said processing;
   d. based on said selected pricing model, calculating a processing cost for the processing of said data file associated with said usage record; and,
   e. issuing a payment request to said client responsible for payment of said calculated processing cost.

17. The method as recited in claim 16, wherein said step of selecting a pricing model to calculate a processing cost is determined from a scan data file characteristic selected from the group consisting of the length of the scan, the type of weld scanned, the scan file size, the number of weld indications present in the scan file, the amount of processing time required to process the scan data file, the temporal processing priority assigned to processing the scan data file, and whether real-time feed-back of the presence of certain types of indications is utilized.

18. The method as recited in claim 17, wherein said data processing step comprises the steps of:
   a. wherein each said scan data file holds a plurality of two dimensional, coordinate based cell matrices representing slices of known thickness of a scanned weld seam, and wherein each cell holds a reflection amplitude value representing a potential weld flaw along the weld seam, using a computer processor to extract weld indications from said data file by saving all non-zero magnitude values in each said cell into a table recording weld indications while preserving location information of each said cell along said weld seam in said table;
   b. assigning a significance score to each said extracted indication saved in said new indications table based upon a preselected criteria;
   c. ranking each said indication based upon said significance score and saving said ranking in said table;
   d. integrating said indications table into said scan data file; and,
   e. based on said significance score, electronically producing a human perceivable account showing a portion of said ranked indications along with associated location information for each in said weld seam for a weld inspector's review.

19. The method as recited in claim 18, wherein said method for monetizing further includes the step of viewing an admin console displaying a usage record displaying information created from said processing step.

20. The method as recited in claim 19, wherein said step of selecting a pricing model comprises calculating a processing cost responsive to a real-time processing and marking scanning action.

* * * * *